Oct. 24, 1950    F. J. TIPPEN    2,527,203
WEAR DISTRIBUTION DEVICE FOR FRICTION WHEELS
Original Filed April 30, 1945
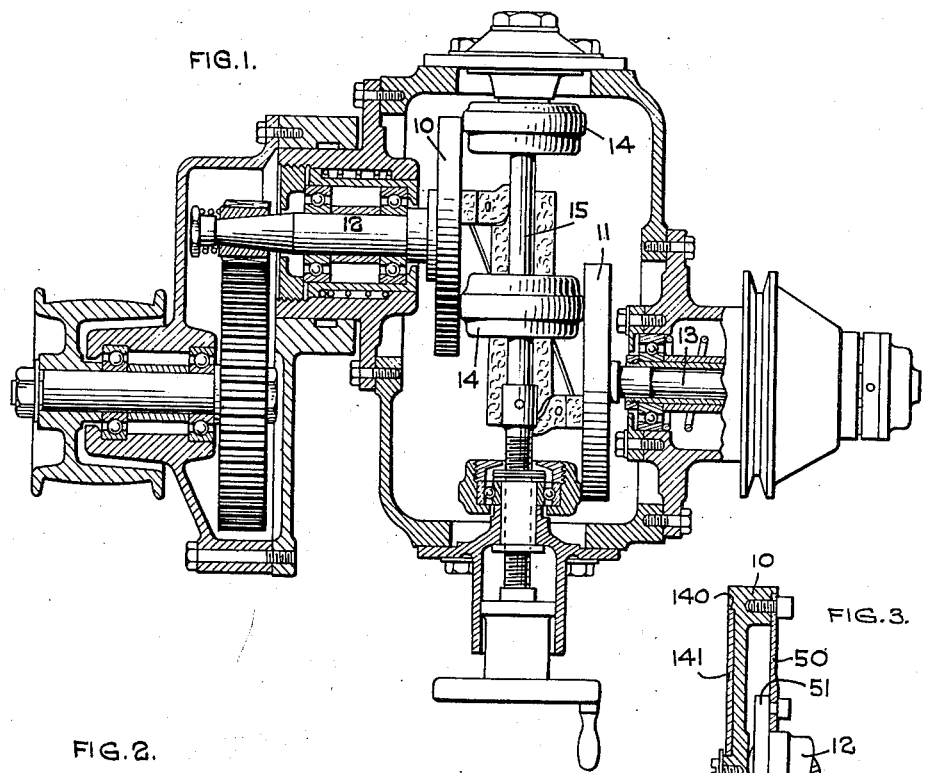
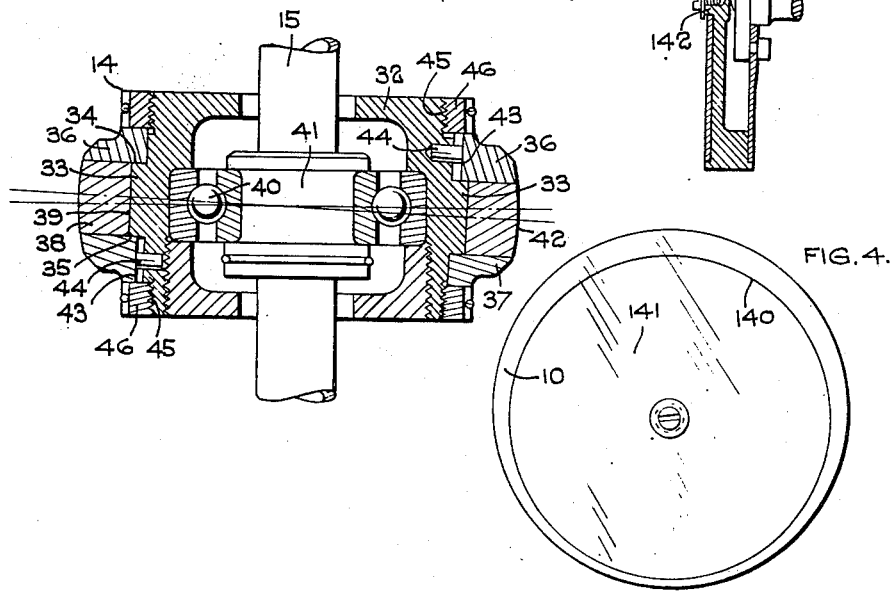
INVENTOR
Frank John Tippen
BY Otto Munk
HIS ATTORNEY Patented Oct. 24, 1950

2,527,203

UNITED STATES PATENT OFFICE 2,527,203

WEAR DISTRIBUTION DEVICE FOR FRICTION WHEELS

Frank John Tippen, Coventry, England

Original application April 30, 1945, Serial No. 591,083. Divided and this application March 11, 1947, Serial No. 733,748. In Great Britain May 5, 1944

Section 1, Public Law 690, August 8, 1946
Patent expires May 5, 1964

9 Claims. (Cl. 74—194)

This invention relates to a variable speed gear of the kind which includes driving and driven discs mounted on parallel out-of-line shafts and frictionally coupled together by a transverse transmitting friction disc mounted for movement parallel to the faces of the driving and driven friction discs, being a divisional on application Serial No. 591,083, filed April 30, 1945.

With such an arrangement the working surface of the transmitting friction disc is theoretically a line extending around its periphery, and an object of the present invention is to provide a construction wherein the points of contact are dispersed across an appreciable width of the periphery of the transmitting friction disc, instead of lying always on the same circumferential line.

A further object of the invention is to construct the transmitting friction disc so that any wear that takes place on its periphery instead of forming a flat thereon will maintain a part-spherical characteristic of the surface.

Other objects of my invention will become apparent from the following description.

Referring to the drawings:

Figure 1 is a sectional plan view showing one construction of gear in accordance with the present invention;

Figure 2 is a sectional view showing the preferred construction of friction-transmitting disc;

Figure 3 is a sectional view in side elevation of the driving disc; and

Figure 4 is an end view of the driving disc.

In the construction shown the driving disc is shown at 10 and the driven disc at 11. The disc 10 is mounted upon a shaft 12, and the disc 11 is mounted on a shaft 13, the shafts 12 and 13 being parallel to each other but being out of line.

The discs 10 and 11 are coupled together frictionally by a friction-transmitting disc 14 mounted on a shaft 15 which is parallel to the faces of the discs 10 and 11.

The transmitting disc 14 is constructed as shown in Figure 2, wherein the body 32 is provided with a peripheral flange 33, opposite sides 34 and 35 of which are obliquely disposed in relation to a plane which is at right angles to the axis of the body 32.

Rings 36 and 37 are detachably secured against the shoulders 34 and 35, the opposed surfaces of these rings being in line with the shoulders 34 and 35, and between the rings is mounted a renewable tire 38, this tire bearing on a cylindrical surface 39 on the body, the axis of which is inclined to the axis of the body.

The body is mounted on a ball bearing 40 mounted on a flanged collar 41 fixed to the shaft 15 so that endwise movement of the shaft 15 is transmitted to the disc 14. The tire 38 can creep circumferentially on the body as the disc rotates, with the result that the points of contact between the tire and the two discs 10 and 11 become spread over an appreciable width of the part-spherical engaging surface 42, thus distributing wear over a considerable area instead of it being confined to a circumferential line. Further, with this arrangement the periphery of the tire 38 will not tend to wear flat. The part-spherical shape of the surface 42 will continue to be retained even if wear takes place.

The periphery of the flange 33 forms an exterior bearing the axis of which intersects the axis of the bearing 40 and is inclined thereto at a small angle. The tire 38 has its periphery shaped as a portion of a sphere the radius of which is equal to the radius of the periphery.

Each of the rings 36, 37 is provided with a slot 43 which is passed over the projecting end of a pin 44 which is a sliding fit in the body 32 so that each of these rings is prevented from rotation relatively to the body. Further, each end of the body is provided with a screwthread 45 upon which is screwed a lock-nut 46 to keep the rings 36 and 37 in position.

Either the disc 10 or 11, or both, may be constructed as shown in Figures 3 and 4, wherein the face of the disc 10 is provided with a circular recess 140 which is eccentric in relation to the periphery of the disc and mounted in this eccentric recess is a face plate 141. This face plate is mounted on a boss 142 which is concentric with the recess 140 but eccentric in relation to the periphery of the disc.

The face plate 141 is retained against the bottom of the recess by a screw and washer, as shown.

With this arrangement the face plate 141 is able to creep around the centre of the boss 142 during the working of the gear, with the result that the points of contact between the friction-transmitting disc 14 and the plates 141 will not all lie upon a circular line but will become dispersed over an appreciable area of the plate 141.

Further, the disc 10 is of hollow construction at the back and is provided with a somewhat resilient plate 50 by which the disc is secured by a flange 51 on the driving shaft 12.

What I claim then is:

1. A power-transmission disc for variable speed gear of the kind specified comprising a body having a peripheral flange, opposite sides of which are disposed in parallel planes which are inclined to a plane at right angles to the axis of the body, rings on the body one on either side of the flange said rings engaging opposite sides of the flange, said rings being secured on the body against rotation relatively thereto and having their opposed surfaces disposed one in line with each side of said flange, the opposed sides of said rings projecting beyond the periphery of said flange, said flange having a periphery the axis of which is inclined to the axis of the body, a renewable tire rotatably mounted between the opposed sides of the rings and on the periphery of the flange, the periphery of said tire being of part-spherical form with its centre at the centre of the tire, means for retaining said rings against axial movement, and means for supporting the body rotatably on a shaft.

2. A power-transmission disc for variable speed gear of the kind specified comprising a hollow body, a bearing in the body for engaging a support, said body having an exterior bearing surface the axis of which intersects the axis of the bearing in the body and is inclined thereto at a small angle, a tire mounted on said exterior bearing surface and capable of rotating relatively to the body, said tire having a periphery of part-spherical form the radius of which is equal to the radius of said periphery, and means for preventing said tire from moving axially.

3. A power-transmission disc for variable speed gear of the kind specified comprising a hollow body, a bearing in the body for engaging a support, said body having an exterior flange the periphery of which forms an exterior bearing surface the axis of which is inclined at a small angle to the axis of the bearing in the body, opposite sides of said exterior flange being disposed in parallel planes which are at right angles to the axis of said exterior bearing surface, rings on the body one on either side of the flange, said rings being secured on the body against rotation relatively thereto and having their opposed surfaces disposed one in line with each side of said flange, the opposed sides of said rings projecting beyond the periphery of said flange, a tire mounted on said exterior bearing surface and capable of rotating relatively to the body, said tire having a periphery of part-spherical form the radius of which is equal to the radius of said periphery, and means for locking said rings against axial movement.

4. In a variable speed gear having rotary driving and driven members providing spaced parallel surfaces, a shaft disposed between and parallel to said surfaces, a power transmission friction disc rotatable around the axis of said shaft and engaged at diametrically opposite positions by the driving and driven members, and means for moving said disc axially, the power transmission friction disc having a tire formed as a circular ring having a part-spherical periphery and mounted on the body of the disc so that it can rotate relatively thereto, the tire being mounted to rotate about an axis which is inclined at a small angle to the axis of rotation of the disc.

5. In a variable speed gear having rotary driving and driven members providing spaced parallel surfaces, a shaft disposed between and parallel to said surfaces, a power transmission friction disc rotatable about the axis of the said shaft and engaged at diametrically opposite positions by the driving and driven members, and means for moving the disc axially, the power transmission disc comprising a body having a peripheral flange, opposite sides of which are disposed in parallel planes which are inclined to a plane at right angles to the axis of the body, rings on the body one on either side of the flange, said rings engaging opposite sides of the flange, said rings being secured on the body against rotation relatively thereto and having their opposed surfaces disposed one in line with each side of said flange, the opposed sides of said rings projecting beyond the periphery of said flange, said flange having a periphery the axis of which is inclined to the axis of the body, a renewable tire rotatably mounted between the opposed sides of the rings and on the periphery of the flange, the periphery of said tire being of part-spherical form with its centre at the centre of the tire, means for retaining said rings against axial movement, and means for supporting the body rotatably on a shaft.

6. In a variable speed gear having rotary driving and driven members providing spaced parallel surfaces, a shaft disposed between and parallel to said surfaces, a power transmission friction disc rotatable around the axis of said shaft and engaged at diametrically opposite positions by the driving and driven members, and means for moving the disc axially, the power transmission disc comprising a hollow body, a bearing in the body for engaging a support, said body having an exterior bearing surface the axis of which intersects the axis of the bearing in the body and is inclined thereto at a small angle, a tire mounted on said exterior bearing surface and capable of rotating relatively to the body, said tire having a periphery of part-spherical form the radius of which is equal to the radius of said periphery, and means for preventing said tire from moving axially.

7. In a variable speed gear having rotary driving and driven members providing spaced parallel surfaces, a shaft disposed between and parallel to said surfaces, a power transmission friction disc rotatable around the axis of the said shaft and engaged at diametrically opposite positions by the driving and driven members, and means for moving said disc axially, the power transmission disc comprising a hollow body, a bearing in the body for engaging a support, said body having an exterior flange the periphery of which forms an exterior bearing surface the axis of which is inclined at a small angle to the axis of the bearing in the body, opposite sides of said exterior flange being disposed in parallel planes which are at right angles to the axis of said exterior bearing surface, rings on the body one on either side of the flange, said rings being secured on the body against rotation relatively thereto and having their opposed surfaces disposed one in line with each side of said flange, the opposed sides of said rings projecting beyond the periphery of said flange, a tire mounted on said exterior bearing surface and capable of rotating relatively to the body, said tire having a periphery of part-spherical form the radius of which is equal to the radius of said periphery, and means for locking said rings against axial movement.

8. In a variable speed gear having a driving disc and a driven disc arranged with opposed parallel face portions, a transmitting disc supported for rotation on an axis transverse to the axes of said driving and driven discs, said transmitting disc including an idle body portion having a circumferentially-extending recess in its edge with the plane of said recess inclined at a small angle out of perpendicularity with the axis of said transmitting disc and a driving torque transmitting tire supported in said recess having a periphery of part-spherical form, the periphery having its centre of curvature disposed at the centre of the tire, for frictional engagement with said opposed face portions and having the remaining portions engaging frictionally and slidably with the walls of said recess whereby automatic creeping of the tire relatively to the body occurs in the normal operation of the gear substantially independently of the driving torque transmitted whilst maintaining constant engagement of the gear.

9. In a variable speed gear, rotary driving and driven members providing spaced parallel surfaces, means drivingly coupling said surfaces, said means comprising a friction disc supported between said surfaces for movement parallel to said surfaces, said disc being provided with a resilient tire formed as a circular ring and mounted on the body of the disc, said tire engaging said surfaces, the disc being provided with means rotatably supporting the tire for rotation about an axis which is inclined at a small angle to the axis of the disc, and the rotary driving member comprising a disc formed with a circular recess in its working face, said recess being eccentric in relation to the axis about which said last named disc rotates, a boss on the last named disc at the center of the recess, a circular plate mounted for rotation on said boss in said recess, and means for retaining said plate in said recess.

FRANK JOHN TIPPEN.

REFERENCES CITED

The following references are of record in the file of this patent:

UNITED STATES PATENTS

| Number | Name | Date |
|---|---|---|
| 1,175,893 | Schoenky | Mar. 14, 1916 |
| 1,245,865 | Bugbee | Nov. 6, 1917 |
| 1,665,902 | Bastian | Apr. 10, 1928 |

FOREIGN PATENTS

| Number | Country | Date |
|---|---|---|
| 386,095 | France | Apr. 4, 1908 |
| 883,564 | France | July 8, 1943 |